US011585125B2

(12) United States Patent
Chapuis et al.

(10) Patent No.: US 11,585,125 B2
(45) Date of Patent: Feb. 21, 2023

(54) APPARATUSES THAT SECURE WEARABLES TO DISPLAY TABLES AND OTHER DISPLAY SURFACES

(71) Applicant: OnQ Solutions, Inc., Hayward, CA (US)

(72) Inventors: Paul F. Chapuis, Woodside, CA (US); Steven D. Penny, Oakland, CA (US); Sean A. Naderzad, San Jose, CA (US)

(73) Assignee: ONQ SOLUTIONS, INC., Hayward, CA (US)

( * ) Notice: Subject to any disclaimer, the term of this patent is extended or adjusted under 35 U.S.C. 154(b) by 172 days.

(21) Appl. No.: 17/159,733

(22) Filed: Jan. 27, 2021

(65) Prior Publication Data

US 2021/0355714 A1    Nov. 18, 2021

Related U.S. Application Data

(60) Provisional application No. 63/026,326, filed on May 18, 2020.

(51) Int. Cl.
| *A47F 7/024* | (2006.01) |
| *E05B 73/00* | (2006.01) |
| *A47F 7/02*  | (2006.01) |
| *F16M 13/02* | (2006.01) |

(52) U.S. Cl.
CPC .......... *E05B 73/0017* (2013.01); *A47F 7/022* (2013.01); *A47F 7/024* (2013.01); *A47F 7/0246* (2013.01); *E05B 73/00* (2013.01); *F16M 13/02* (2013.01)

(58) Field of Classification Search
CPC ......... E05B 73/00; F16M 13/02; A47F 7/024; A47F 7/0246; A47F 7/022
See application file for complete search history.

(56) References Cited

U.S. PATENT DOCUMENTS

| 6,831,560 B2 | 12/2004 | Gresset |
| 9,194,532 B2 * | 11/2015 | Bisesti .................... A47F 7/024 |
| 10,165,873 B2 | 1/2019 | Gulick, Jr. et al. |
| 10,394,297 B1 | 8/2019 | Han |

(Continued)

OTHER PUBLICATIONS

InVue, "Wearables Solutions: Complete display security solutions for wearables," invue.com, Aug. 6, 2019, 4 pages.

(Continued)

*Primary Examiner* — Bradley Duckworth
(74) *Attorney, Agent, or Firm* — Vierra Magen Marcus LLP

(57) ABSTRACT

A security apparatus is disclosed herein for securing a secured object to a tabletop of a display table or to another display surface. The security apparatus comprises a housing with a support surface for supporting the secured object. A pair of arm assemblies extend above the support surface and are configured to move between an open position where the secured object may be placed on or removed from the support surface. A mechanical drivetrain is provided for actuating the arm assemblies between the open and closed positions. When the security apparatus is attached to a tabletop of a display table, at least a portion of an actuator of the mechanical drivetrain will extend beneath the surface of the display table, which should be made inaccessible to the public.

20 Claims, 13 Drawing Sheets

(56) References Cited

U.S. PATENT DOCUMENTS

| | | | | |
|---|---|---|---|---|
| 10,448,759 | B1* | 10/2019 | Chapuis | F16B 2/10 |
| 10,808,430 | B2* | 10/2020 | Lucas | F16M 11/041 |
| 10,920,922 | B2* | 2/2021 | Chapuis | F16M 13/02 |
| 11,346,136 | B2* | 5/2022 | Gulick, Jr. | E05B 73/0082 |
| 11,363,895 | B2* | 6/2022 | Schutt | A47F 7/0246 |
| 11,408,551 | B2* | 8/2022 | Chapuis | F16M 11/04 |
| 11,412,865 | B2* | 8/2022 | Chapuis | G08B 13/14 |
| 2018/0342136 | A1 | 11/2018 | Hartweg et al. | |
| 2021/0238892 | A1* | 8/2021 | Gulick, Jr. | G08B 13/149 |
| 2021/0270410 | A1* | 9/2021 | Horvath | F16M 11/041 |

OTHER PUBLICATIONS

MTI, "Freedom Micro FlexTech," Brochure, www.MTIGS.com, Oct. 2019, 3 pages.

Scorpion Security Products, "Smartwatch Scorpion: Apple Watch," Brochure, www.scorpionsp.com, Nov. 2019, 1 page.

Scorpion Security Products, "Smartwatch Scorpion: Garmin," Brochure, www.scorpionsp.com, Nov. 2019, 1 page.

Scorpion Security Products, "Smartwatch Scorpion: Gizmo," Brochure, www.scorpionsp.com, Nov. 2019, 1 page.

Scorpion Security Products, "Smartwatch Scorpion: Samsung Galaxy Active2," Brochure, www.scorpionsp.com, Nov. 2019, 1 page.

Scorpion Security Products, "Smartwatch Scorpion: Samsung," Brochure, www.scorpionsp.com, Nov. 2019, 1 page.

\* cited by examiner

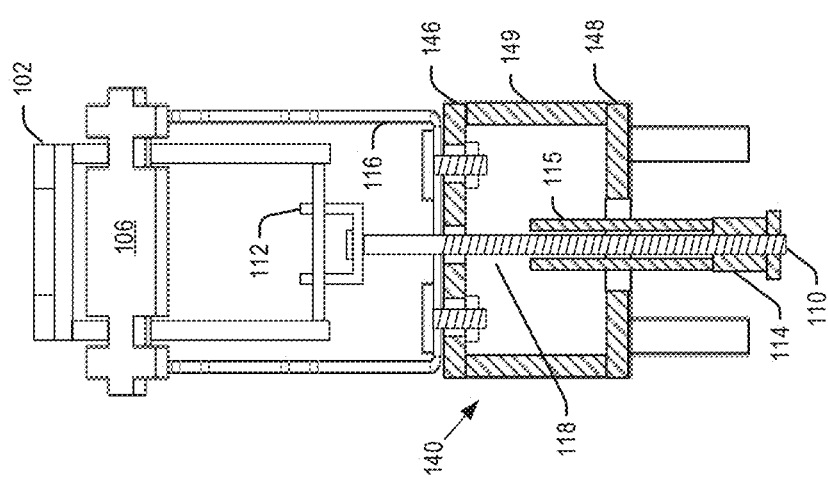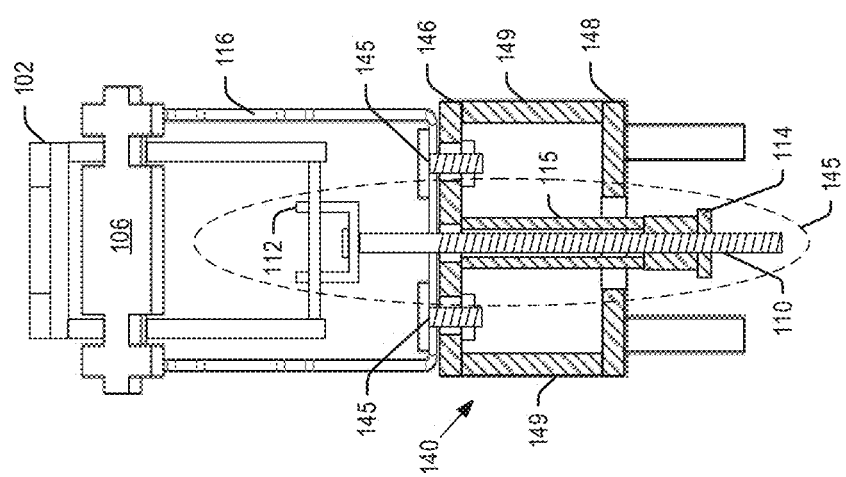

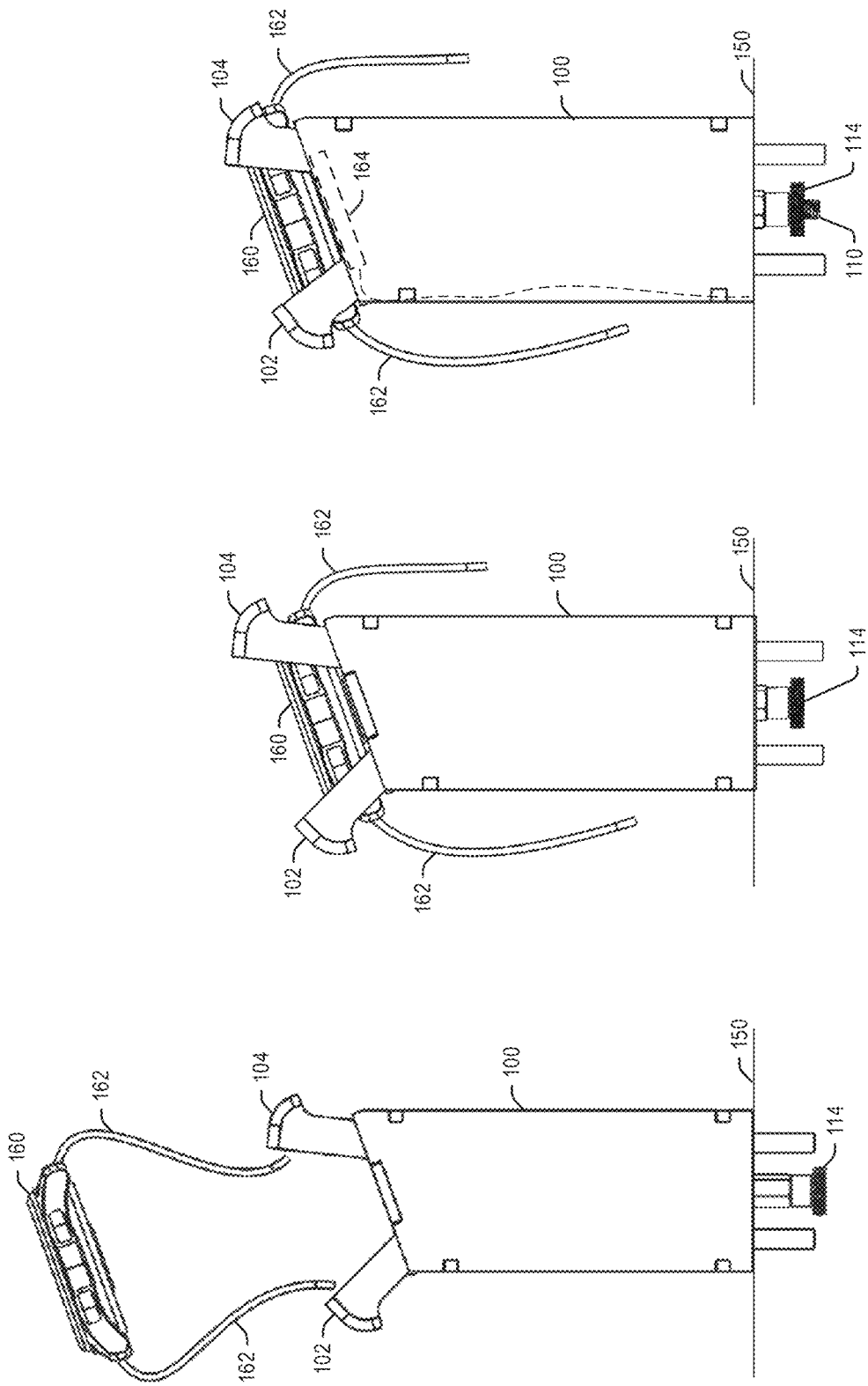

FIG. 29
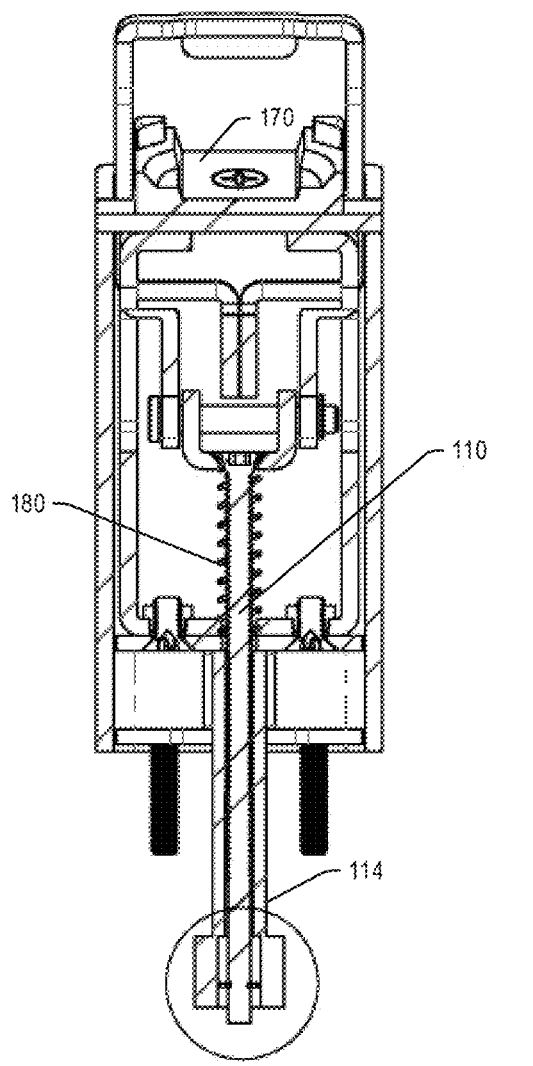
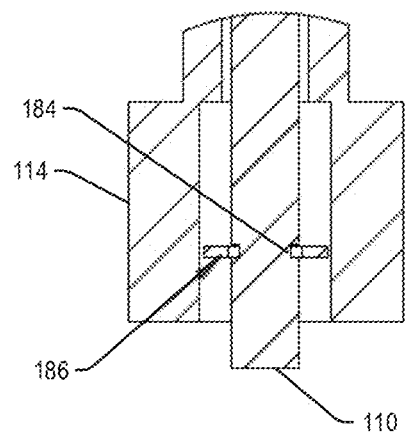
FIG. 30

US 11,585,125 B2

APPARATUSES THAT SECURE WEARABLES TO DISPLAY TABLES AND OTHER DISPLAY SURFACES

PRIORITY CLAIM

This application claims priority to U.S. Provisional Patent Application No. 63/026,326, filed May 18, 2020, which is incorporated herein by reference.

FIELD OF TECHNOLOGY

Embodiments of the present technology relate to apparatuses that secure wearable electronic devices to tabletops of display tables and to other display surfaces.

BACKGROUND

Wearable electronic devices, such as smart watches and fitness trackers, are often sold in retail stores. To enable customers to view, touch, and interface with such wearable electronic devices, which are also referred to herein more succinctly as "wearables", such wearables are often displayed on a display table. Since such wearables are often costly, it would be preferable if they could be secured to the display table to prevent theft. While there are currently some apparatuses available to securely display wearables in retail stores, it would be beneficial if further and improved display apparatus were available.

SUMMARY

Security apparatuses of the present technology are adapted to selectively secure a wearable or other secured object to a tabletop of a display table or to another display surface. In accordance with certain embodiments, a security apparatus includes a support surface configured to support the secured object. The security apparatus further includes first and second arm assemblies, each including arms and a top cap connected between the arms, the arm assemblies configured to move between an open position where the secured object may be positioned on or removed from the support surface, and a closed position where the first top cap secures the secured object on the support surface. The security apparatus further includes a mechanical drivetrain for actuating the first and second arm assemblies between their open and closed positions, the mechanical drivetrain including an actuator such as a thumbscrew for actuating the mechanical drivetrain. The security apparatus is configured to have the actuator positioned in an enclosed space that is not publicly accessible.

In accordance with certain embodiments, downward movement of the mechanical drivetrain translates the first and second arm assemblies downward and the first and second top caps toward each other to position the first and second arm assemblies in their closed positions.

In accordance with certain embodiments, the mechanical drivetrain includes a screw indirectly coupled to bottom portions of the first and second arm assemblies. The actuator translates the screw up and down to move the arm assemblies between their open and closed positions.

In accordance with certain embodiments, the security apparatus further includes a housing to which the support surface is attached. The arms of the first and second arm assemblies extend through the support surface into the housing. Ends of the arms within the interior of the housing are rotatably coupled to the mechanical drivetrain.

In accordance with certain embodiments, the mechanical drivetrain includes: a bracket to which bottom portions of the arms of the first and second arm assemblies are mounted; a screw affixed to the bracket; and a thumbscrew as the actuator. The thumbscrew is supported within the housing so as to rotate but maintain a constant elevation relative to the housing. The thumbscrew is threaded around the screw such that rotation of the thumbscrew clockwise and counterclockwise translates the screw up and down.

In accordance with certain embodiments, the security apparatus further includes a housing and a housing base fixedly mounted within the housing.

In accordance with certain embodiments, the mechanical drivetrain includes: a bracket to which bottom portions of the arms of the first and second arm assemblies are mounted; a screw affixed to the bracket and extending through the housing base; a collar having first and second ends, the first end positioned adjacent a surface of the housing base, the screw extending through the collar; and a thumbscrew as the actuator. The thumbscrew is supported at the second end of the collar so as to rotate but maintain a constant elevation relative to the housing. The thumbscrew is threaded around the screw such that rotation of the thumbscrew clockwise and counterclockwise translates the screw up and down.

In accordance with certain embodiments, the first arm assembly includes arms having a straight length which connect to an exterior of the bracket.

In accordance with certain embodiments, the second arm assembly includes arms that bend toward each other along their lengths which connect to an interior of the bracket.

In accordance with certain embodiments, the security apparatus is configured to secure a secured object to a surface for displaying the secured object. In such embodiments, the security apparatus includes: a housing; a support surface affixed to the housing and configured to support the secured object; first and second arm assemblies configured to move between an open position where the secured object may be placed on or removed from the support surface, and a closed position where the first and second arm assemblies lock the secured object on the support surface; and a mechanical drivetrain for actuating the first and second arm assemblies between their open and closed positions. The mechanical drivetrain includes an actuator for actuating the mechanical drivetrain. The actuator is positioned in an enclosed space that is not publicly accessible.

In accordance with certain embodiments, the security apparatus is configured to secure a secured object to a surface for displaying the secured object. In such embodiments, the security apparatus includes: a housing; a support surface affixed to the housing and configured to support the secured object; first and second arm assemblies configured to move between an open position where the secured object may be placed on or removed from the support surface, and a closed position where the first and second arm assemblies lock the secured object on the support surface; and a mechanical drivetrain configured to move along a central axis of the housing. The arm assemblies are coupled to the mechanical drivetrain such that movement of the mechanical drivetrain along the central axis moves the arm assemblies between their open and closed positions. The mechanical drivetrain includes an actuator for actuating the mechanical drivetrain to move along the central axis. The actuator is inaccessible from the surface when the security device is mounted to the surface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 17A-17C are cross-sectional views showing components for translating the pull bracket and arm assemblies up and down within the housing according to an embodiment of the present technology.

FIG. 24 is a side view of the apparatus of the present technology with the arms in an open position receiving a wearable device.

FIG. 25 is a side view of the apparatus of the present technology with the arms in an open position and a wearable device seated on the housing cover.

FIG. 26 is a side view of the apparatus of the present technology with the arms in closed position securing a wearable device within the apparatus.

FIGS. 29-30 are cross-sectional views showing configurations of the central screw and thumb screw according to further embodiments.

DETAILED DESCRIPTION

The benefits, features, and advantages of the various embodiments of the present technology will become better understood with regard to the following description and accompanying drawings. The following description is presented to enable one of ordinary skill in the art to make and use embodiments of the present technology as provided within the context of a particular application and its requirements. Various modifications to the embodiments described herein will, however, be apparent to one skilled in the art, and the general principles defined herein may be applied to other embodiments. Therefore, the embodiments of the present invention are not intended to be limited to the particular embodiments shown and described herein, but are to be accorded the widest scope consistent with the principles and novel features herein disclosed.

Figure 1:
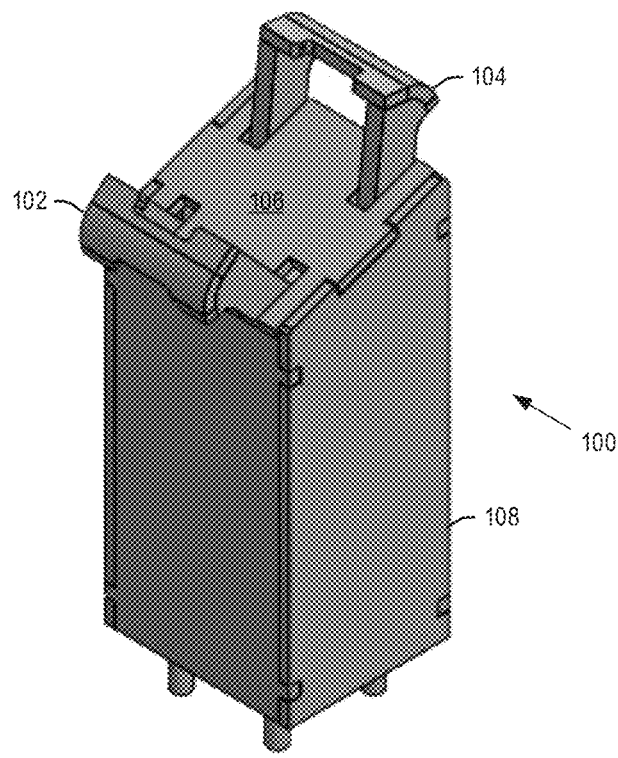
FIG. 1 is top perspective view of a security apparatus according to an embodiment of the present technology.
Figure 2:
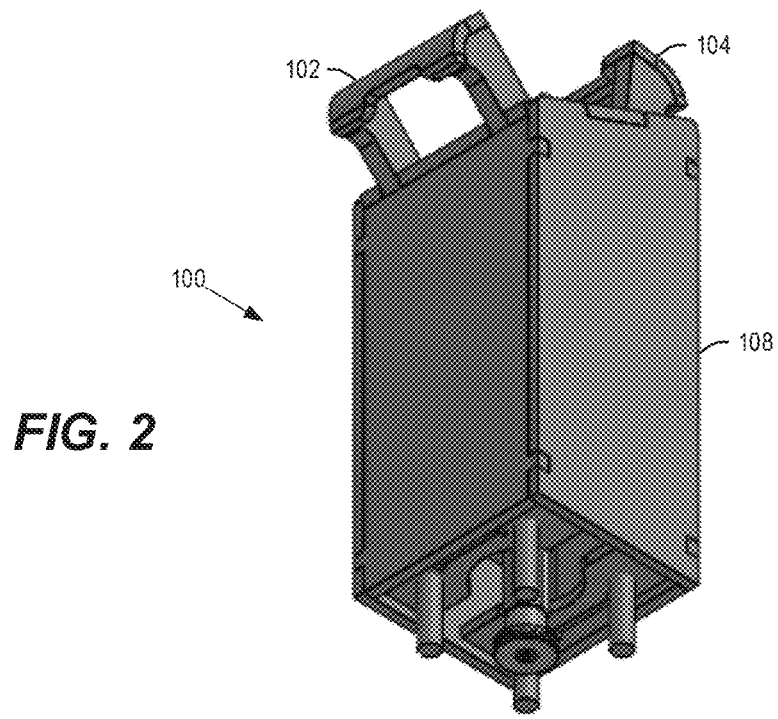
FIG. 2 is a bottom perspective view of the security apparatus according to an embodiment of the present technology.

FIGS. 1 and 2 is are top and bottom perspective views of a security apparatus 100 according to an embodiment of the present technology. The security apparatus 100 is used to secure object to a tabletop for display. The object may typically be a wearable device, which is also referred to herein more succinctly as a "wearable." Examples of a wearable include a smart (or other) watch, mobile phone, laptop, tablet, fitness tracker, jewelry, etc. However, in general, the security apparatus 100 may be used to secure a wide variety of objects for display, which objects are generally referred to herein as "secured objects."

As shown in FIGS. 1 and 2, as well as other figures, the security apparatus 100 in general includes first and second arm assemblies 102 and 104 protruding from a support surface such as cover plate 106 of a tube, or housing, 108. The first and second arm assemblies 102, 104 are capable of moving between an open position (shown in FIGS. 1 and 2) and a closed position. In the open position, a secured object may be inserted into the arm assemblies 102, 104 onto cover plate 106, or removed from the security apparatus 100. As an example, straps of a wearable may be inserted into the arm assemblies 102, 104 and the case may be supported on the cover plate 106. In the closed position, the arm assemblies secure, or lock, the secured object onto the cover plate to prevent its removal from the security apparatus 100. Moreover, the arm assemblies 102, 104 fully travel from open to closed while remaining secure at any point in between. The components of security device 100 and their operation are explained below.

Figure 3:
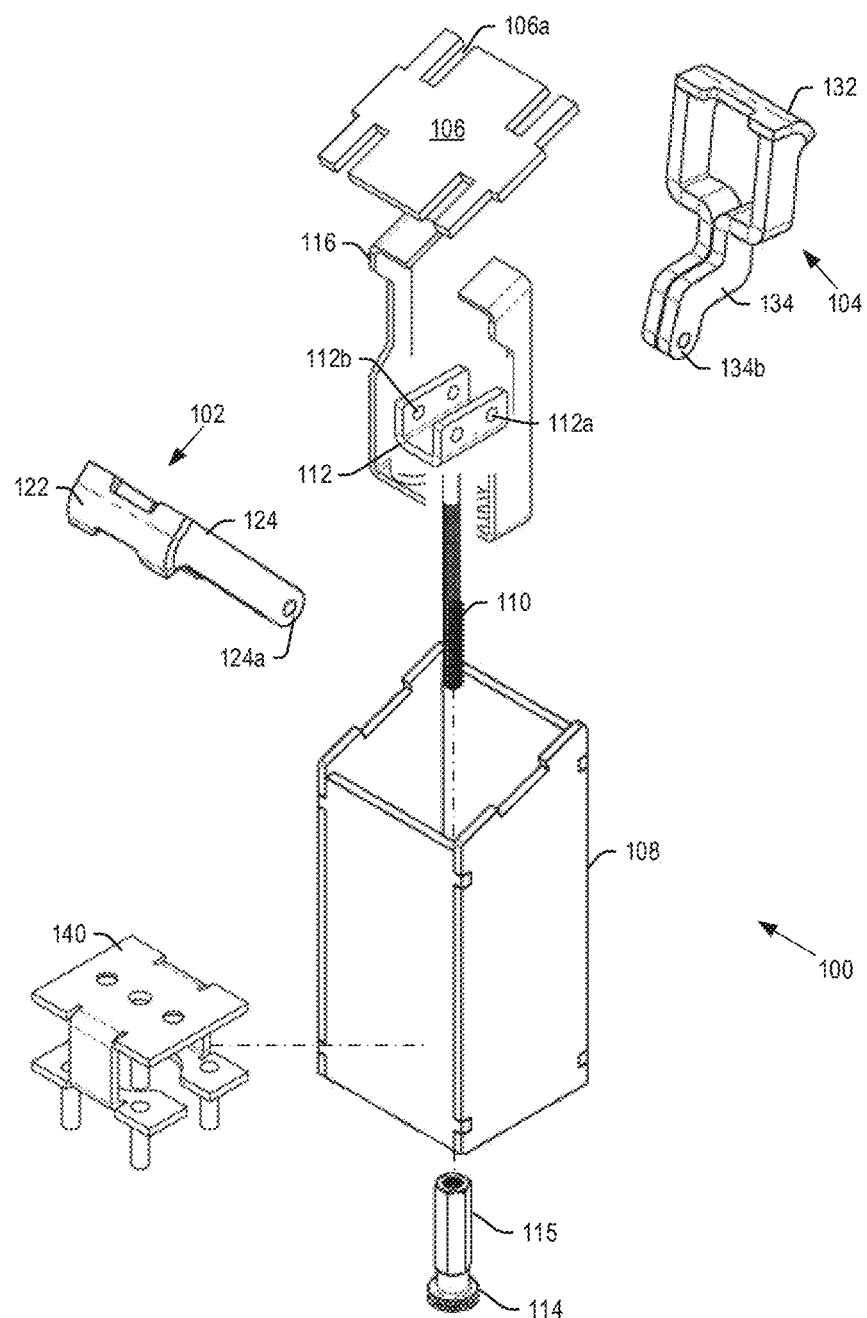
FIG. 3 is an exploded perspective view of the security apparatus according to an embodiment of the present technology.
Figure 4:
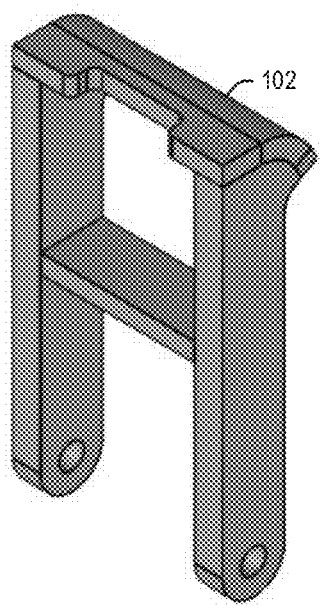
FIG. 4 is a perspective view of a first arm assembly according to an embodiment of the present technology.
Figure 5:
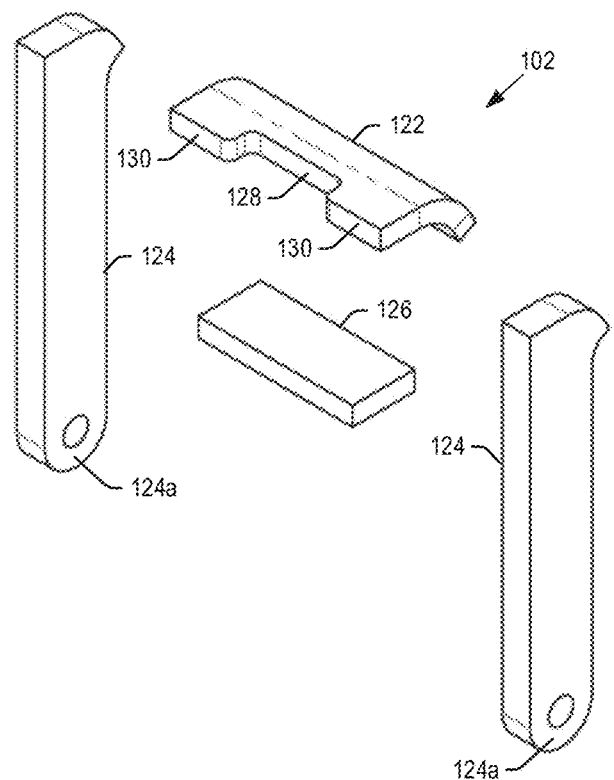
FIG. 5 is an exploded perspective view of the first arm assembly according to an embodiment of the present technology.
Figure 6:
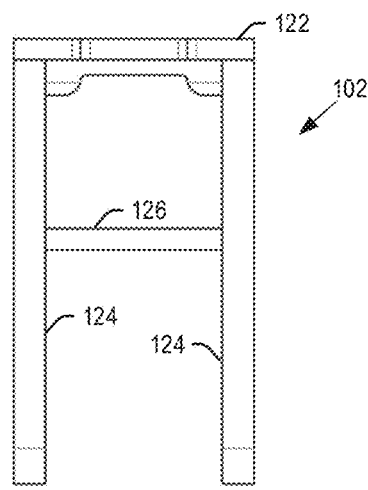
FIG. 6 is a front view of the first arm assembly according to an embodiment of the present technology.
Figure 7:
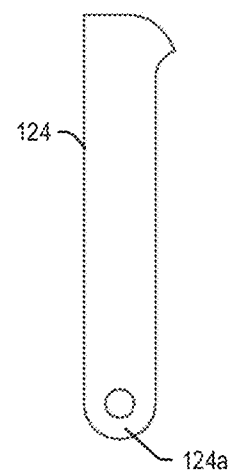
FIG. 7 is a side view of a single arm of the first arm assembly according to an embodiment of the present technology.
Figure 8:
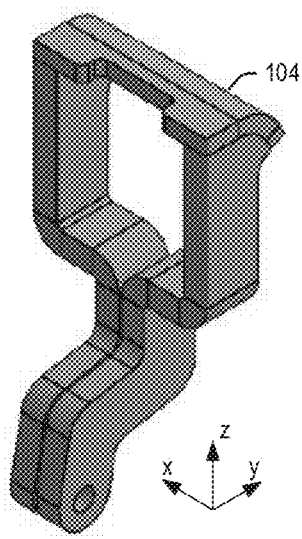
FIG. 8 is a perspective view of a second arm assembly according to an embodiment of the present technology.
Figure 9:
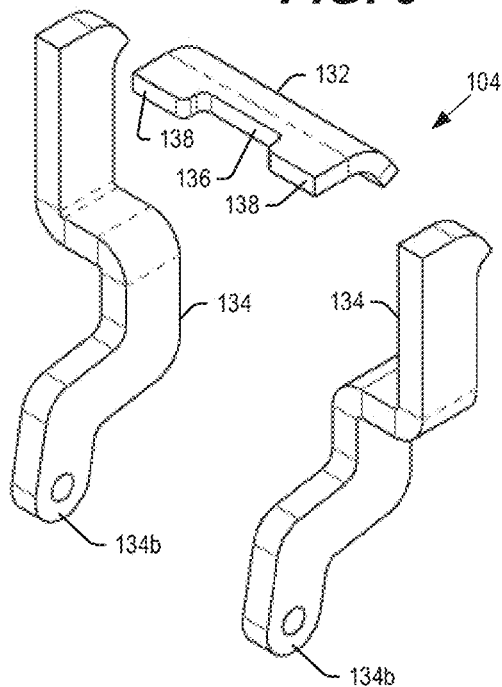
FIG. 9 is an exploded perspective view of the second arm assembly according to an embodiment of the present technology.
Figure 10:
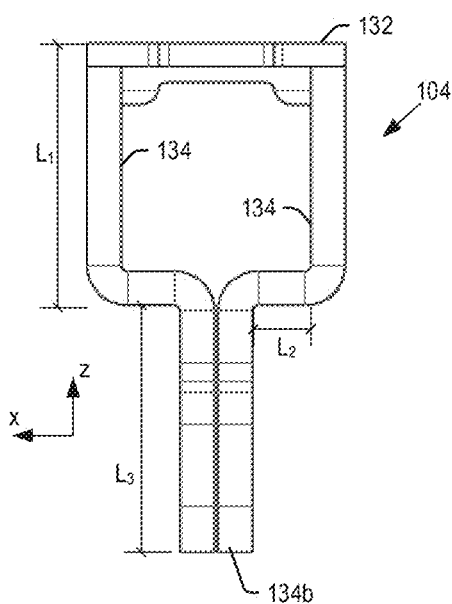
FIG. 10 is a front view of the second arm assembly according to an embodiment of the present technology.
Figure 20:
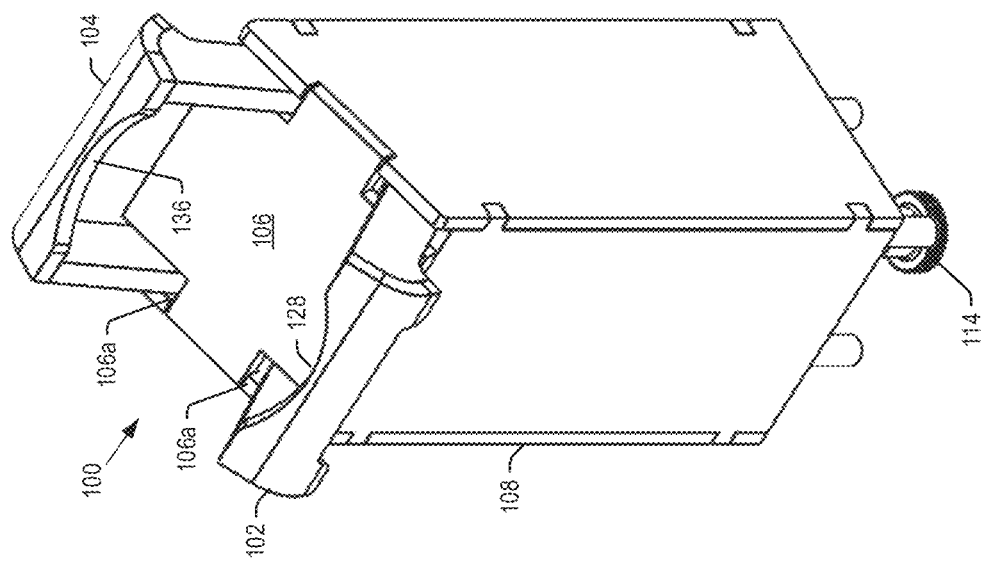
FIG. 20 is a perspective view of the apparatus of the present technology with the arms in an open position.

FIG. 3 is an exploded perspective view of the security apparatus 100. The first and second arm assemblies include arms extending through slots 106a formed in the cover plate 106. As explained below, the size of cover plate 106, the positions of slots 106a and the spacing between the arms in assemblies 102, 104 may all vary depending upon the dimensions of the secured object to be secured on apparatus 100. For example, while the cover plate 106 of FIG. 3 includes slots 106a spaced inward from the edges of cover plate 106, FIG. 20 shows an example where the slots 106a are at the outer edges of cover plate 106.

FIGS. 4-7 show perspective, front and side views of the first arm assembly 102. As shown, the first arm assembly 102 includes a top cap 122 affixed to a pair of arms 124. Each arm 124 may be identical to the other, and have a straight length of about 2.34 inches, and may have a thickness of 0.18 inches. The length and thickness of the arms 124 may vary, depending in part on the size and shape of the secured object. A spacer 126 may also be mounted between the arms 124 to provide support and a constant parallel spacing between the arms 124. The top cap 122 and spacer 126 may have a length of 1.35 inches, but these lengths may vary, depending in part on the size and shape of the secured object. The top cap 122 and spacer 126 may be affixed to the arms 124 as by welding, bolting, gluing and/or other affixation means. In further embodiments, the arm assembly 102 may be formed as singled cast piece instead distinct arms 124 and top cap 122.

The top cap 122 may include a recessed section 128 defining edge sections 130. The recessed sections 128 and edge sections 130 may be shaped for a particular secured object, so that the secured object is engaged and secured by edge sections 130. The shape of recessed section 128 and edges 130 may vary based on the shape of the secured object. For example, FIG. 20 shows a top cap including a rounded recessed section 128. Other configurations are possible. In further embodiments, the recessed section 128 may be omitted.

FIGS. 8-11 show perspective, front and side views of the second arm assembly 104, as well as an X, Y, Z-axis Cartesian frame of reference. As shown, the second arm assembly 104 includes a top cap 132 affixed to a pair of arms 134. The arms 134 of the second arm assembly are shaped with bends along multiple axes which enable the arms 134 to fit within housing 108 and move together between the open and closed positions without interference with the arms 124 of the first arm assembly 102. The arms 134 may include top portions affixed to a top cap 132, as by welding, bolting, gluing or other affixation method. In further embodiments, the arm assembly 104 may be formed as singled cast piece instead distinct arms 134 and top cap 132. The top portions of the arms extend from the top cap 132 a distance, $L_1$, which in embodiments may be 1.25 inches. The pair of arms 134 then have right angle bends in the X-Z plane into second portions that extend toward each other. In embodiments, the second portions may have a length, $L_2$, which in embodiments may be 0.49 inches. The pair of arms 134 then have another a right angle bend in the X-Z plane into third portions that extend downward to a bottom end 134b of the arms. The third portion may have a length, $L_3$, which may for example be 1.29 inches.

Figure 11:
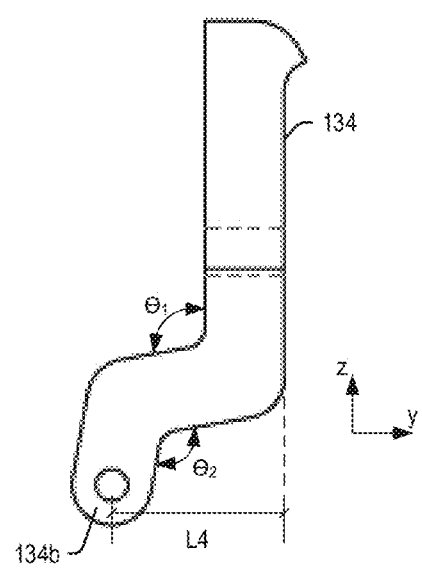
FIG. 11 is a side view of a single arm of the second arm assembly according to an embodiment of the present technology.
Figure 12:
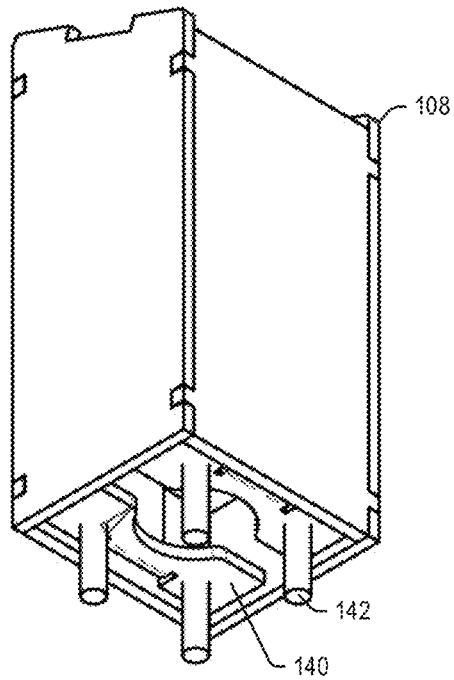
FIG. 12 is a bottom perspective view of a housing according to embodiments of the present technology.
Figure 13:
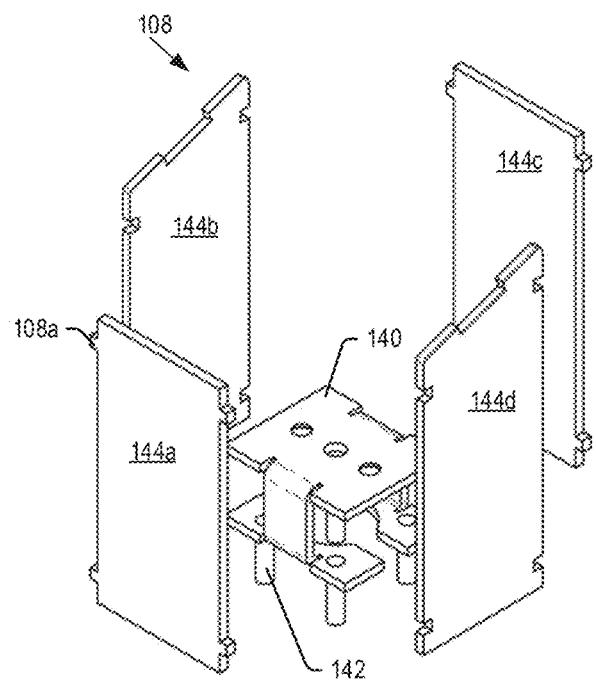
FIG. 13 is an exploded perspective view of the housing according to an embodiment of the present technology.
Figure 14:
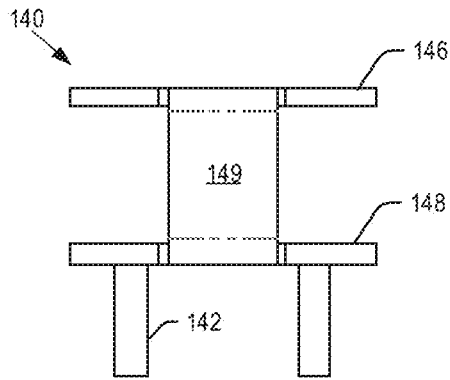
FIG. 14 is a front view of the housing base according to an embodiment of the present technology.
Figure 15:
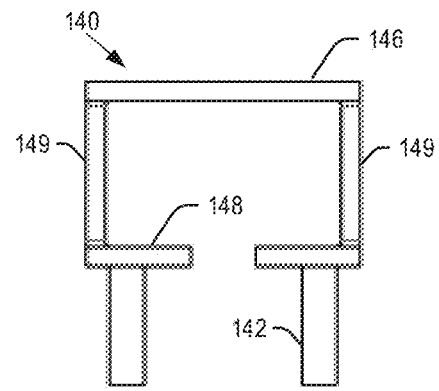
FIG. 15 is a side view of the housing base according to an embodiment of the present technology.

As seen in FIG. 11, the third portions of each arm 134 are not straight, but have bends in the Y-Z plane. In particular, the third portions of the arms 134 may have a first bend forming an angle, $\Theta_1$, of for example 100°. The third portions of the arms 134 may have a second bend in the opposition direction forming an angle, $\Theta_2$, of for example 110°. In all, the third portions of the arms 134 may extend a length, $L_4$, of for example 0.87 inches in the Y-Z plane. Each of the arms 134 may have a thickness of 0.18 inches. It is understood that each of the dimensions and angles set forth above for the contours of the arms 134 is by way of example only, and may vary in further embodiments to enable the second arm assembly to move between an open position where the secured object may be inserted within the arms 134, and a second position where the second arm assembly secures the secured object on the cover plate 106.

As with arm assembly 102, the top cap 132 of arm assembly 104 may include a recessed section 136 defining edge sections 138. The recessed sections 136 and edge sections 138 may be shaped for a particular secured object so that the secured object is secured by edge sections 138. The shape of recessed section 136 and edges 138 may vary based on the shape of the secured object. For example, FIG. 20 shows a top cap including a rounded recessed section 136. Other configurations are possible. In further embodiments, the recessed section 136 may be omitted.

Referring again to the exploded perspective view of FIG. 2, the bottom portions of arm assemblies 102, 104 connect to a pull bracket 112 having a generally rectangular, U-shaped cross-section and configured to move vertically within housing 108. In particular, the bottom portions of the arm assemblies 102, 104 are cross-connected to the pull bracket 112, so the bottom portions 124a of arm assembly 102 may be bolted to holes 112a of pull bracket 112, and the bottom portions 134b of arm assembly 104 may be bolted to holes 112b of pull bracket 112. The configurations of the arms 124, 134 of assemblies 102, 104 are provided such that the arms 124 of assembly 102, which are spaced apart at their bottom portions, connect to the pull bracket 112 at an exterior of the pull bracket 112. The arms 134 of assembly 104, which are adjacent each other at their bottom portions, connect to the pull bracket 112 within an interior of the pull bracket 112.

Pull bracket 112 is affixed to a screw 110, which extends through the housing 108 and is connected to a thumbscrew 114 beneath the housing 108. Rotation of the thumbscrew 114 clockwise and counterclockwise moves the pull bracket vertically up and down within the housing 108 as explained below. The cross-connection of the arms of the assemblies 102, 104 to pull bracket 112 allows a scissor-type action of the arm assemblies that provides a maximum range of movement of the top caps 122, 132 between the open and closed positions for a given vertical range of motion of pull bracket 112.

FIGS. 2 and 12-15 show perspective, front and side views of the housing 108 and a housing base 140. Housing 108 may be formed of four vertical panels 144a, 144b, 144c and 144d (collectively, panels 144) connected to each other to form an enclosure with a rectangular cross-section. It is understood that housing 108 may have other cross-sections in further embodiments, including for example circular and elliptical. The vertical panels 144 may connect to each other by various means, including for example welding, crimping or gluing at tabs 108a, bolting or by other affixation methods. In further embodiments, housing 108 may be extruded as a single-piece hollow tube.

As seen for example in FIG. 1, cover plate 106 may be affixed to the top edges of the panels 144, for example by welding, crimping or gluing. In embodiments, opposed panels 144b and 144d have angled top edges, and panel 144a may be smaller than panel 144c. Thus, the cover plate 106 may be mounted atop the housing 108 at an angle to facilitate viewing of the secured object when seated on cover plate 106. In one embodiment, each panel may have a width of 1.75 inches, panel 144a may have a height of 3.55 inches and panel 144c may have a height of 4.36 inches. These dimensions may vary in further embodiments. In further embodiments, all the panels 144 may the same dimensions and the cover plate 106 may be mounted horizontally.

As seen in FIGS. 2 and 12-15, the housing base 140 may be mounted in a lower portion of the housing 108. The housing base includes a top plate 146 and a bottom plate 148 connected to each other by a pair of struts 149. In embodiments, the housing base 140 may be affixed to the housing 108 by welding, bolting, gluing or other affixation methods, with the bottom plate 146 at or near the bottom edges of panels 144. The top and bottom plates 146, 148 may have the same dimensions, for example with a length of 1.76 inches and a width of 1.49 inches. The struts 149 may space the top and bottom plates from each other by distance of 1 inch. These dimensions are by way of example only and may vary in further embodiments.

Figure 16:
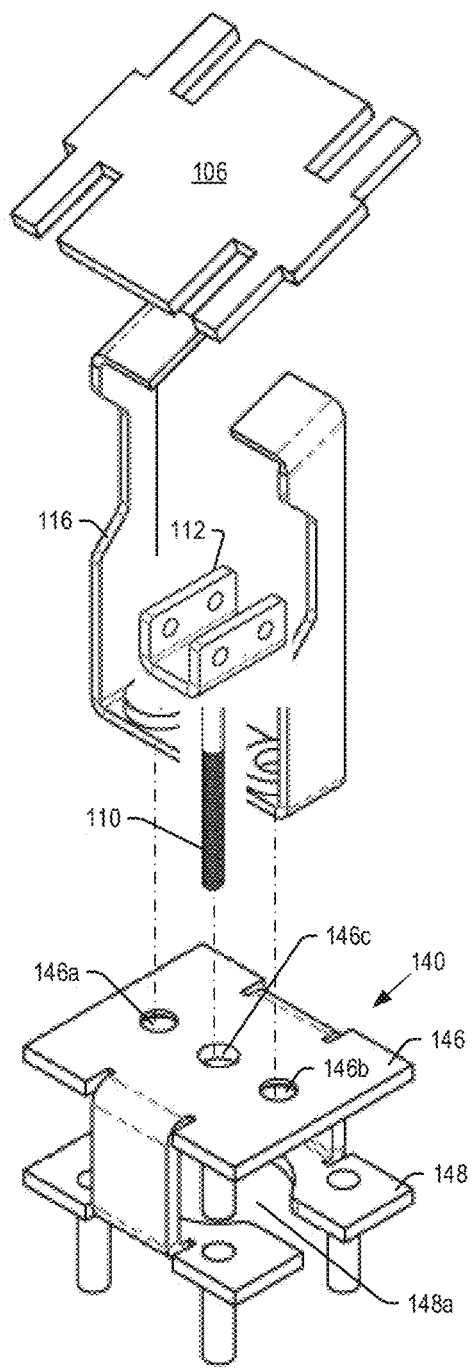
FIG. 16 is an exploded perspective view of a housing cover and housing cover support according to an embodiment of the present technology.

Referring to the perspective view of FIG. 16, a top cover support 116 may be affixed to top plate 146 as by bolts 145 (FIG. 17A) or other fasteners through holes 146a and 146b in top plate 146. The top cover 106 may be affixed to the top cover support 116 as by welding or gluing. The screw 110 of the pull bracket 112 may fit loosely down through a central hole in the top cover support 116, and loosely through a hole 146c in the top plate 146 of the housing base 140. The screw 110 may further extend through a central hole 148a in the bottom plate 148, whereupon the screw 110 receives thumbscrew 114 as explained below. In embodiments, screw 110 may have a length of 2.38 inches, though the length of screw 110 may be greater or lesser than that in further embodiments.

Referring again to FIGS. 12-15, a number of posts 142, such as for example 4, may extend from the bottom plate 148 of housing base 140. The posts 142 are used to secure the security apparatus 100 to a surface of a display table as explained below. The posts may for example be threaded for receiving a bolt on the underside of the display table surface. The posts 142 may alternatively be threaded screws fitting through holes in the bottom plate 148. In further embodiments, the posts 142 need not be threaded.

In operation, translation of the pull bracket 112 within housing 108 causes the arm assemblies 102, 104 to move between the open and closed positions. FIGS. 17A-17C are cross-sectional views illustrating the mechanisms within the security apparatus 100 for translating the pull bracket 112 and arm assemblies 102 and 104 (a single arm assembly 102 is shown for clarity). As noted above, the arm assemblies 102, 104 are mounted to the pull bracket 112, and the pull bracket 112 is affixed to screw 110. The screw 110 fits down through the top cover support 116, through housing base 140 and protrudes through the bottom plate 148 of housing base 140.

An annular collar 115 fits loosely over (i.e., not threaded on) the screw 110 within the housing base 140. The collar 115 is held on the screw 110 by the thumbscrew 114. In particular, the thumbscrew 114 include interior threads meshing with the threads of screw 110. Screw 110 is mounted to bracket 112 so that it does not rotate. Thus, rotation of the thumbscrew 114 on screw 110 will move the thumbscrew 114 and collar 115 relative to the screw 110. In embodiments, the screw 110, pull bracket 112, thumbscrew 114 and collar 115 comprise a drivetrain 145 (in dashed oval in FIG. 17A) for translating the arm assemblies 102, 104 between their open and closed positions. In such a drivetrain 145, the thumbscrew 114 may be considered an actuator, which may be rotated to actuate the drivetrain 145 up and down within housing 108 to open and close the arm assemblies 102, 104. As explained below, the drivetrain 145 may contain fewer components, or alternative or additional components, in further embodiments.

FIG. 17A shows a view of security apparatus 100 with the thumbscrew tightened to its full extent on screw 110. In this position, the thumbscrew 114 has rotated (e.g., counterclockwise) and moved upward along screw 110 so that the collar 115 abuts against a lower surface of top plate 146, and the pull bracket 112 and arm assemblies 102, 104 are tightened down over cover plate 106 (on a secured object, not shown).

Thereafter, rotation of the thumbscrew 114 in the opposite direction (e.g., clockwise) will move the thumbscrew 114 and collar 115 downward relative to screw 110. When the security apparatus is affixed to a horizontal surface, gravitational forces may maintain the arm assemblies 102, 104 and the pull bracket in their lowermost positions as shown in FIG. 17B, but the downward movement of the thumbscrew 114 and collar 115 will create a space 118 between the top of the collar 115 and the lower surface of the top plate 146.

The space 118 allows the arm assemblies 102, 104 to be manually pulled upward (in the direction of arrow A) and opened, as shown FIG. 17C. The arm assemblies 102, 104 may be pulled upward, for example until the collar 115 abuts against the lower surface of top plate 146. In this position, a secured object may placed on or removed from the cover plate 106.

In order to lock a secured object on cover plate 106, the arm assemblies 102, 104 may be opened when the thumbscrew is rotated downward along screw 110 (FIG. 17C). The arm assemblies may be lowered as by gravity (FIG. 17B), and the thumbscrew 114 may then be rotated (e.g., counterclockwise) to move the thumbscrew 114 and collar 115 upward, until the collar 115 abuts against the lower surface of top plate 146 (FIG. 17A) to lock the object on the cover plate 106.

In further embodiments, it is conceivable that a first end of the collar 115 be affixed to the lower surface of top plate 146, the thumbscrew 114 be rotatably affixed to the second end of the collar such that the thumbscrew can rotate relative to the collar, but both the collar and thumbscrew remain at a constant elevation within housing 108. In such embodiments, the thumbscrew 114 and collar 115 will remain in the positions shown in FIGS. 17A and 17C, and rotation of the thumbscrew 114 will move the screw 110 (together with pull bracket 112 and arm assemblies 102, 104) up and down between the positions shown in FIGS. 17A and 17C. It is further understood that the lengths of thumbscrew 114 and collar 115 may vary, together or independently of each other. In further embodiments, the collar 115 may be omitted entirely and the thumbscrew 114 be made longer.

Figure 19:
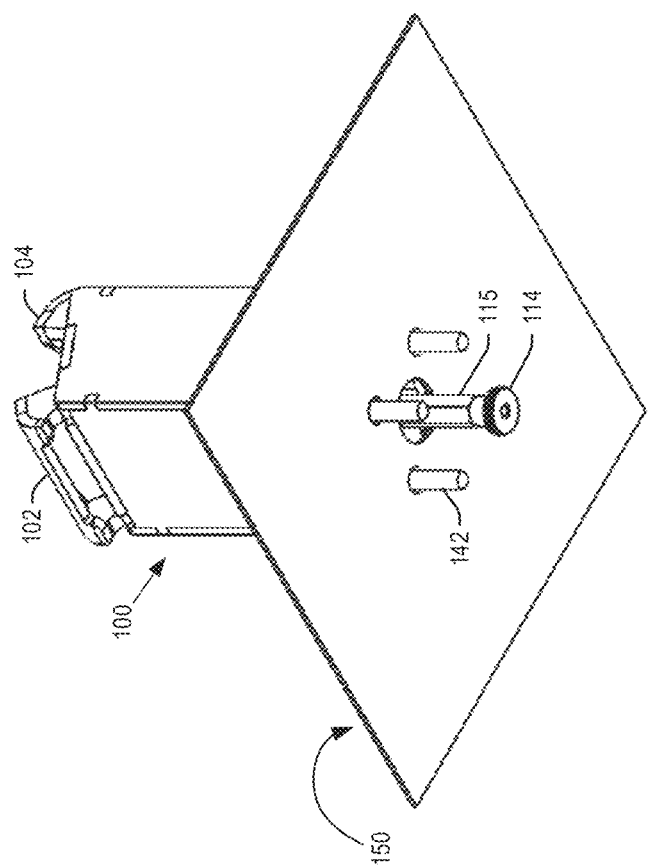
FIG. 19 is a bottom perspective view of an apparatus according to an embodiment of the present technology positioned adjacent a display table to which the apparatus is to be mounted.
Figure 18:
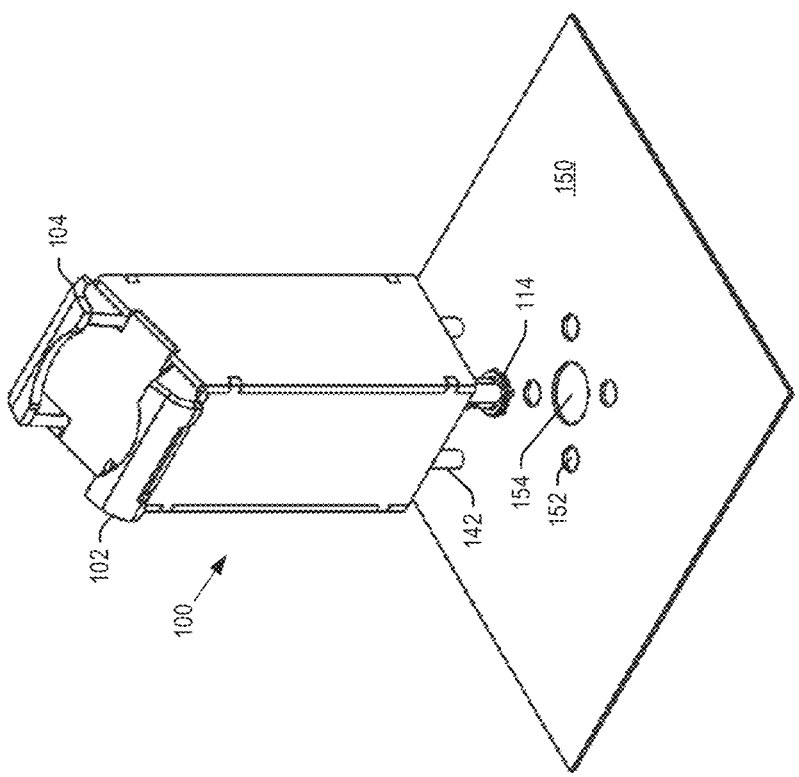
FIG. 18 is a top perspective view of an apparatus according to an embodiment of the present technology positioned adjacent a display table to which the apparatus is to be mounted.

FIG. 18 is a top perspective view of a security apparatus 100 positioned above a surface 150 of a display table to which the security apparatus 100 is to be mounted. As shown, the posts 142 of the housing base 140 are positioned to fit within holes 152 in the surface 150, and the thumbscrew 114 and collar 115 are configured to fit through a larger central hole 154. FIG. 19 is a bottom perspective view of the security apparatus 100 seated on top of the surface 150, with the posts 142 and thumbscrew 114 positions through holes 152, 154. Once properly seated on the surface 150, bolts (or other fasteners) may be affixed to the posts 142 to lock the security apparatus on the display surface 150. Thereafter, rotation of the thumbscrew will open and close the arm assemblies 102 and 104.

The thumbscrew 114 is configured to be positioned on an underside of surface 150, in a space beneath surface 150 that is not publicly accessible. That is, the space beneath surface 150 may be a secure enclosure accessible only to authorized personnel who, for example, have a key to unlock the secure enclosure, and not accessible to the general public viewing the secured object. Such authorized personnel may access the space beneath display surface 150 to secure the security apparatus 100 to the surface 150 by posts 142. The authorized personnel may then place a secured object on the cover plate 106, and then rotate the thumbscrew to close the arm assemblies 102, 104 and lock the secured object on the cover plate 106. Thereafter, the authorized personnel may lock the enclosure or space beneath the surface 150.

In one example, the posts 142 may be screws or otherwise threaded, and wing nuts may be affixed to the posts 142 using only a person's fingers. This design provides advantages in that the security apparatus 100 may be affixed to surface 150 and made operational without the need for any handheld tools. As such, the costs associated with such tools are eliminated, and there is no concern of needing to store tools or of losing and needing to replace such tools. Further, the security apparatus 100 disclosed herein is easy and intuitive to assemble, and thus, requires minimal instructions for assembly and use.

It is understood that the security apparatus 100 may be affixed to the surface 150 by fasteners other than posts 142. For example, posts 142 may be omitted and replaced by threaded holes formed for example in bottom plate 148. In such embodiments, screws (including for example wing screws) may then be inserted through holes 152 from an underside of surface 150 into the threaded holes in the bottom plate 148 to affix the security apparatus 100 to the surface 150. In further embodiments, the bottom plate 148 may have holes (not threaded) for receiving toggle anchor bolts from the underside of surface 150. The toggle anchors may be inserted through the holes and opened, and then the bolts tightened down onto the underside of the surface 150. Other fasteners are contemplated for affixing the security apparatus to the surface 150, which fasteners are not accessible from the top of surface 150 of the display table.

Figure 21:
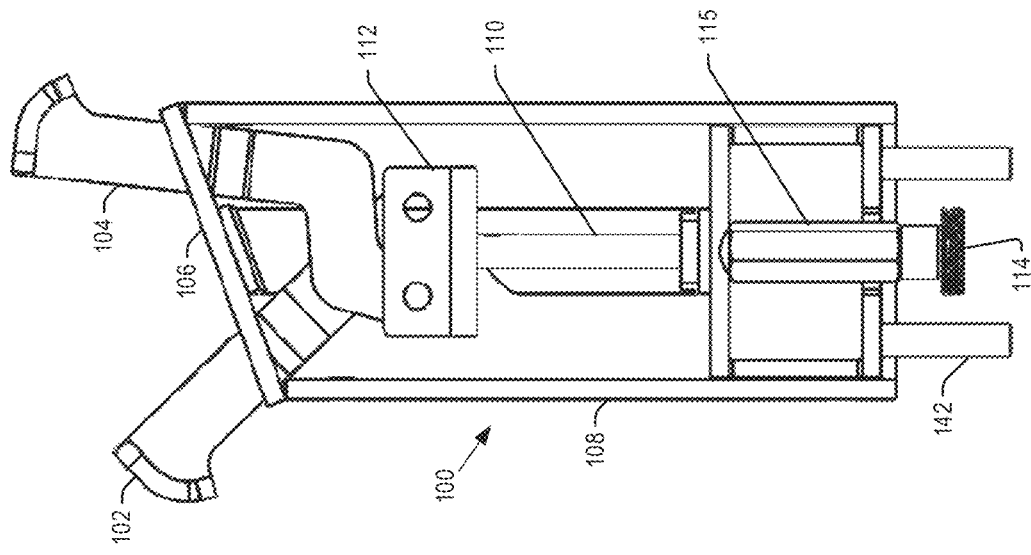
FIG. 21 is a cross-sectional side view of the apparatus of the present technology with the arms in an open position.

FIGS. 20 and 21 are perspective and cross-sectional views of the security apparatus 100 with the arm assemblies 102, 104 in an open position. As shown, thumbscrew 114 has rotated the screw 110 and pull bracket 112 to a relatively upward position. In this position, the top caps 122, 132 of assemblies 102, 104 are relatively splayed apart and capable of accepting a secured apparatus such as the straps of a smart-watch therein.

Figure 23:
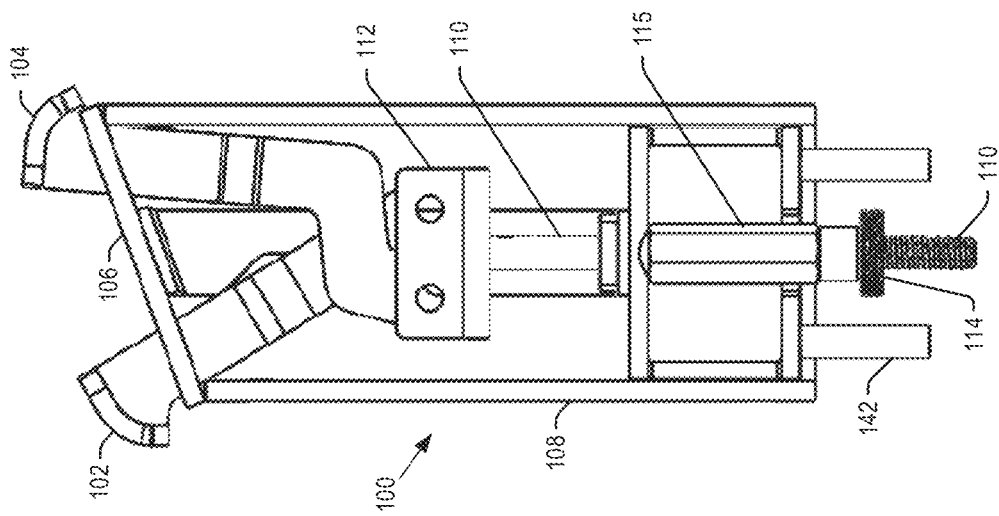
FIG. 23 is a cross-sectional side view of the apparatus of the present technology with the arms in a closed position.
Figure 22:
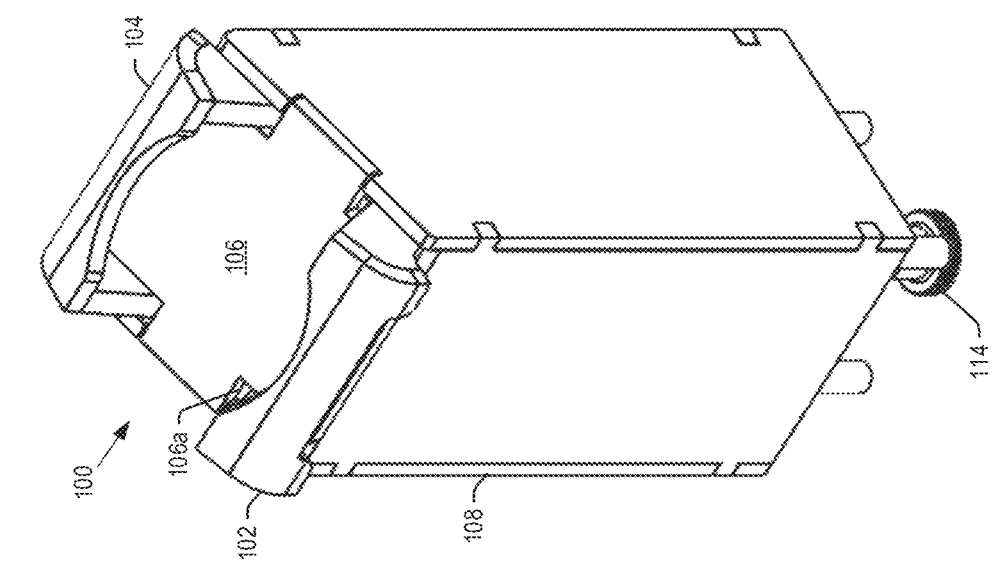
FIG. 22 is a perspective view of the apparatus of the present technology with the arms in a closed position.

FIGS. 22 and 23 are perspective and cross-sectional views of the security apparatus 100 in a closed position. As shown, thumbscrew 114 has rotated the screw 110 and pull bracket 112 to a relatively downward position. As the pull bracket 112 moves downward, the arm assemblies 102, 104 are also pulled downward. As the arms assemblies move downward, the engagement of the arms 124 and 134 of assemblies 102, 104 against the upper edges of the housing 108 in the slots 106a cause the top caps 122, 132 of assemblies 102, 104 to rotate toward each other, eventually engaging portions of the secured object to lock the secured object on the cover plate 106.

FIGS. 24-26 are side views of a secured object 160 being positioned within security apparatus 100. In these embodiments, the secured object 160 is a smart-watch or other wearable including bands or straps 162. In FIG. 24, the arms of assemblies 102, 104 are open, ready to receive the wearable. In FIG. 25, the straps have been slid into the arm assemblies 102, 104 and the case of wearable 160 rests on cover plate 106. In FIG. 25, the thumbscrew 114 has been rotated to move pull bracket 112 downward, and the arm assemblies 102, 104 downward and toward each other to a position where the top caps 122, 132 either engage the case of the wearable, or are close enough to prevent its removal. The wearable 160 may be removed from the security apparatus 100 by rotating the thumbscrew 114 in the opposite direction to lift and open the arm assemblies 102, 104.

In embodiments described above, the security apparatus 100 includes a mechanical drivetrain 145 for actuating the arm assemblies 102, 104 between their open and closed positions. It is understood that the mechanical drivetrain may include other force transmission mechanisms instead of, or in addition to, the pull bracket 112, screw 110, thumbscrew 114 and collar 115. Such additional force transmission mechanisms may include for example a rack, pinion or other types of gears and/or rods.

Additionally, it is understood that an actuator other than thumbscrew 114 may be used to actuate the mechanical drivetrain, including for example a lever, ratchet or crank wheel. In embodiments, those actuators may be manually actuated, providing advantages such as simplicity and no independent electrical power source needed. However, in further embodiments, it is possible that the mechanical drivetrain be powered by an electrical power source. In such embodiments, the actuator may be a motor, contained for example at the base of housing 108. A button or switch may be provided, accessible within the secured enclosure beneath surface 150 (or at some other location not publicly accessible), to turn the motor on and off, which then actuates the mechanical drivetrain to move the arm assemblies 102, 104 between their open and closed positions.

In embodiments, the security apparatus 100 may include a charging device for charging the secured object where the secured object is an electronic device. For example, FIG. 26 schematically shows a charger 164 mounted to an underside of cover plate 106 for charging the wearable 160 when positioned within the security apparatus 100. Such a charger 164 is capable of wirelessly charging an electronic secured object 160 using for example electromagnetic, inductive, or radio frequency (RF) charging. In one example, the charger 164 can utilize the Qi standard, which is an open interface standard developed by the Wireless Power Consortium, and defining wireless power transfer using inductive charging over distances of up to 4 cm. Such a charger 164 can include a connector port (not shown), such as a USB or Lighting cable connector port, that enables the charger to be plugged into a power source via a universal serial bus (USB) or Lighting cable, or the like. The shape and size and overall form factor of the charger 164 can be customized for use with a specific wearable. In further embodiments, the charger 164 may be positioned on a top surface of the cover plate 106. The charger may be omitted in further embodiments.

In the example shown in FIGS. 24-26, the secured object 160 is a wearable. Examples of such wearables for which the security apparatus 100 may be configured include various different models of the APPLE WATCH™ (made by Apple Inc., headquartered in Cupertino, Calif.), various different models of the Fitbit™ (made by Fitbit, Inc. headquartered in San Francisco, Calif.), as well as various different models of smart watches and/or fitness trackers made by Samsung Electronics Co., Ltd. (headquartered in Suwon, South Korea), Garmin Ltd. (headquartered in Olathe, Kansa), Fossil Group, Inc. (headquartered in Richardson, Tex.). The security apparatus may be configured for use with other wearables and secured objects in further embodiments.

As noted, in general, the security apparatus 100 may be configured to accept and secure a wide variety of secured objects other than wearables. For example, it is possible that the size of the cover plate 106 and housing 108, as well as the spacing between the arms in arm assemblies 102, 104 be increased to accept and secure a mobile phone, laptop, tablet or other larger electronic device. In such embodiments, the security apparatus 100 would operate in the manner described above. In particular, the security apparatus 100 may be secured to a display table with the thumbscrew 114 or other actuator positioned beneath the display table in a space that is not publicly accessible. The thumbscrew may be rotated in a first direction to position the arm assemblies in their open positions. The electronic device may then be positioned on the cover plate 106 and the thumbscrew may be rotated in the opposite direction to close the arm assemblies around the secured object to lock the secured object on the security apparatus. The arm assemblies 102, 104, cover plate 106 and other components may be customized for a variety of different secured objects.

The security apparatus 100 of the embodiments of the present technology can be used to secure secured objects to other display surfaces besides a horizontal display table. For example, the security apparatus 100 may be affixed to a vertical display wall, if desired, or more generally, to any one of various different types of display surfaces or different types of display fixtures at any of a variety of orientations.

Various elements of the security apparatus 100, including, but not limited to, the arm assemblies 102, 104, cover plate 106, housing 108, pull bracket 112, cover plate support 116 and housing base 140, are preferably made of a strong metal or metal alloy so that the security apparatus 100 is sturdy and cannot be readily bent, cut through, or otherwise broken or tampered with. For example, such elements can be made of steel. Different elements of the security apparatus 100 can be made of the same metal or different metals than other elements. All such elements can be painted, powder coated, or otherwise covered to have any desired color and appearance.

Certain elements, such as the components of arm assemblies 102, 104, can be cast, molded, and/or machined. Other elements, such as the cover plate 106 and the panels 144 of housing 108, can be cut or stamped from a sheet of metal or alloy. Blanks for elements such as the cover plate support 116 and housing base 140, can be cut or stamped from a sheet of metal or alloy and then bent into their final shapes. Such cutting can be performed by plasma cutting, laser cutting, mechanical cutting, or milling, but is not limited thereto. The various through-holes (e.g., 146a-c) can be drilled (e.g., by a drill press) or otherwise made (e.g., using a laser) in blanks before they are bent, or after they are bent, and may even be drilled or otherwise made before the blanks are cut or stamped from one or more sheet(s) of metal or alloy. As noted, various elements can be welded to one another using brazing, soldering, arc welding, or the like, to fixedly attach the elements to one another.

Figure 27:
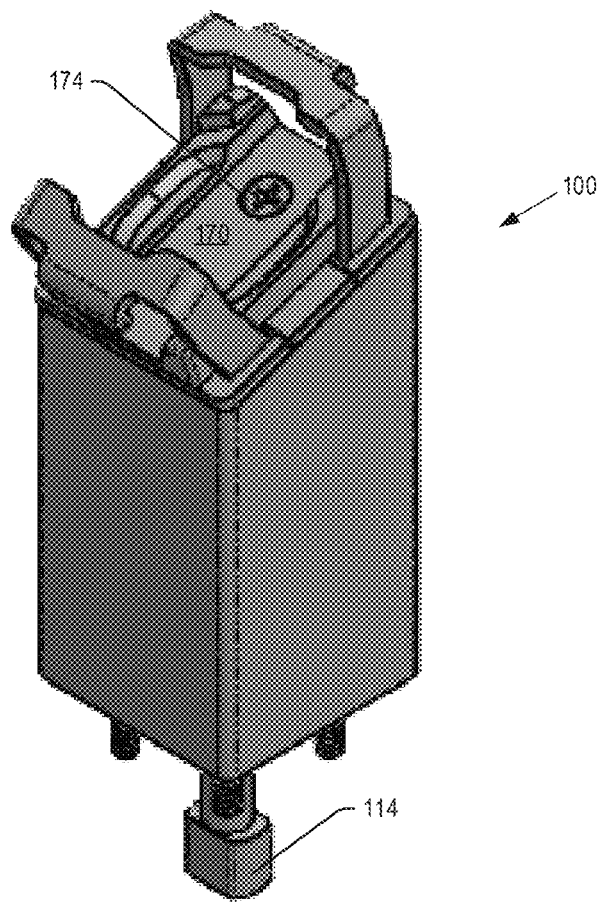
FIGS. 27-28 are perspective views showing a spacer which may be customized to hold a specific secured object in alternative embodiments.
Figure 28:
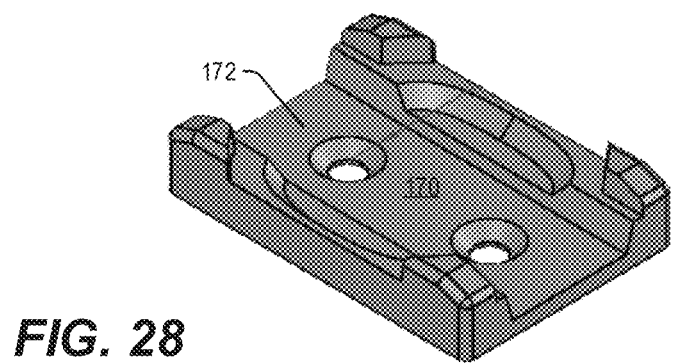

As noted above, various changes and/or additions may be made to the security apparatus 100 in further embodiments. A few such changes/additions are shown in FIGS. 27-30. FIG. 27 is perspective view a security apparatus 100 including for example a screw-on spacer 170. FIG. 28 is an enlarged view of the screw-on spacer 170. The spacer 170 provides a collection of cutouts to a generic or specific assortment of watches or other secured objects 160. This allows shorter watches, such as bands, to sit lower on the cover plate 106 and allows the arm assemblies to travel further inward securing the rigid/hard components of the watch. Bands also sit in a channel 172 to reduce side to side movement. The spacer 170 may be customized to secure a particular watch or other secured object 160. Various other cutouts allow watches to sit different heights to allow for an ideal arm placement, as well as aligning or centering the position of the watch to achieve a more secure and visually centered placement. This allows for a single design to fit all required needs. The spacer 170 may be secured through holes in the spacer and cover plate 106 via screws 174 (one of which is shown in FIG. 27).

FIG. 27 also shows that side surfaces of thumb screw 114 may be flattened to provide enhanced gripping and rotation of thumb screw 114.

FIG. 29 shows a further embodiment of security apparatus 100 including a compression spring 180 positioned around screw 110. As explained above with respect to FIG. 17B, in embodiments, when thumb screw 114 is moved downward relative to screw 110, the arm assemblies may rest in their closed position due to gravity, but may be manually pulled open as shown in FIG. 17C. Use of spring 180 ensures that, as the thumb screw 114 is rotated and moved downward along screw 110, the arm assemblies move to their open position. The compression spring overcomes the gravitational forces on arm assemblies 102, 104 so that the arms open as the thumb screw 114 is rotated downward.

FIG. 30 is an enlarged cross-sectional view of the bottom of screw 110 and thumb screw 114 (circled in FIG. 29). In this embodiment, a bottom portion of screw 110 may include a notch 184 configured to receive an e-clip 186 which effectively increases the diameter of the bottom portion of screw 110. This prevents the thumb screw 114 from being completely unscrewed and removed from screw 110. The e-clip 186 may be removable so that the thumb screw can be removed if so desired.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

The terms "top" and "bottom," "upper" and "lower" and "vertical" and "horizontal" as may be used herein are by way of example and illustrative purposes only, and are not meant to limit the description of the invention inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±2.5%.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A security apparatus configured to secure a secured object on a surface for displaying the secured object, the security apparatus comprising:
    a support surface configured to support the secured object;
    a first arm assembly comprising first arms and a first top cap connected between the first arms, the first arm assembly configured to move between an open position where the secured object may be positioned on or removed from the support surface, and a closed position where the first top cap secures the secured object on the support surface;
    a second arm assembly comprising second arms and a second top cap connected between the second arms, the second arm assembly configured to move between an open position where the secured object may be positioned on or removed from the support surface, and a closed position where the second top cap secures the secured object on the support surface; and
    a mechanical drivetrain configured to actuate the first and second arm assemblies between their open and closed positions, the mechanical drivetrain comprising an actuator configured to translate the first and second arms downward relative to the support surface and the first and second top caps toward each other to position the first and second arm assemblies in their closed positions.

2. The apparatus of claim 1, wherein:
the actuator is positioned in the security apparatus so as to be accessible from an underside of the surface when the security apparatus is mounted to the surface.

3. The apparatus of claim 1, wherein:
downward movement of the mechanical drivetrain translates the first and second arms downward and the first and second top caps toward each other to position the first and second arm assemblies in their closed positions.

4. The apparatus of claim 1, wherein:
the mechanical drivetrain comprises a screw indirectly coupled to bottom portions of the first and second arm assemblies; and
the actuator is configured to translate the screw up and down to move the first and second arm assemblies between their open and closed positions.

5. The apparatus of claim 1, further comprising:
a housing to which the support surface is attached;
wherein the first and second arms extend through the support surface into the housing and
wherein ends of the first and second arms within an interior of the housing are rotatably coupled to the mechanical drivetrain.

6. The apparatus of claim 1, further comprising:
a housing to which the support surface is attached; and
a housing base fixedly mounted within the housing;
wherein the first and second arms extend through the support surface into the housing; and
wherein ends of the first and second arms are within an interior of the housing and are rotatably coupled to the mechanical drivetrain.

7. The apparatus of claim 6, further comprising:
fasteners in the housing base, the fasteners configured to be accessible from an underside of the surface when the security apparatus is secured to the surface.

8. A security apparatus configured to secure a secured object on a surface for displaying the secured object, the security apparatus comprising:
    a support surface configured to support the secured object;
    a first arm assembly comprising first arms and a first top cap connected between the first arms, the first arm assembly configured to move between an open position where the secured object may be positioned on or removed from the support surface, and a closed position where the first top cap secures the secured object on the support surface;
    a second arm assembly comprising second arms and a second top cap connected between the second arms, the second arm assembly configured to move between an open position where the secured object may be positioned on or removed from the support surface, and a closed position where the second top cap secures the secured object on the support surface; and
    a mechanical drivetrain configured to actuate the first and second arm assemblies between their open and closed positions;
    wherein the mechanical drivetrain comprises:
        a bracket to which bottom portions of the first arms and the second arms are mounted;
        a screw affixed to the bracket; and
        a thumbscrew threaded around the screw such that rotation of the thumbscrew in first and second rotational directions translates the thumbscrew up and down relative to the screw.

9. The apparatus of claim 8, wherein:
the first arms have a straight length and connect to an exterior of the bracket; and
the second arms bend toward each other along their lengths and connect to an interior of the bracket.

10. A security apparatus configured to secure a secured object on a surface for displaying the secured object, the security apparatus comprising:
- a housing;
- a support surface affixed to the housing and configured to support the secured object;
- first and second arm assemblies configured to move between an open position where the secured object may be placed on or removed from the support surface, and a closed position where the first and second arm assemblies lock the secured object on the support surface; and
- a mechanical drivetrain configured to actuate the first and second arm assemblies between their open and closed positions, the mechanical drivetrain comprising an actuator configured to actuate the mechanical drivetrain, the actuator positioned so as to be accessible from an underside of the surface when the security apparatus is mounted on the surface.

11. The apparatus of claim 10, further comprising:
fasteners extending from the housing and configured to secure the security apparatus to the surface, the fasteners configured to be accessible from an underside of the surface when the security apparatus is secured to the surface.

12. The apparatus of claim 10, further comprising a housing base within the housing, and wherein:
the mechanical drivetrain comprises:
- a bracket to which bottom portions of the first and second arm assemblies are mounted;
- a screw affixed to the bracket and extending through the housing base;
- a collar having first and second ends, the first end positioned adjacent a surface of the housing base, the screw extending through the collar; and
- a thumbscrew as the actuator, the thumbscrew threaded around the screw such that rotation of the thumbscrew clockwise and counterclockwise translates the thumbscrew up and down relative to the screw, translation of the thumbscrew relative to the screw enabling the first and second arm assemblies to move between their open and closed positions.

13. The apparatus of claim 10, wherein:
the actuator is configured to be manually actuated.

14. The apparatus of claim 10, wherein:
the first and second arm assemblies each include first and second arms, and a respective top cap affixed to ends of the first and second arms.

15. A security apparatus configured to secure a secured object to a surface for displaying the secured object, the security apparatus comprising:
- a housing;
- a support surface affixed to the housing and configured to support the secured object;
- first and second arm assemblies configured to move between an open position where the secured object may be placed on or removed from the support surface, and a closed position where the first and second arm assemblies lock the secured object on the support surface; and
- a mechanical drivetrain including a portion of which is configured to move up and down along a central axis of the housing in response to a screw of the mechanical drivetrain being rotated in first and second rotational directions, the first and second arm assemblies coupled to the mechanical drivetrain such that rotation of the screw about the central axis moves the first and second arm assemblies between their open and closed positions, a portion of the screw of the mechanical drivetrain extending through a bottom of the housing and coupled to an actuator that enables the screw to be manually rotated in the first and second rotational directions.

16. The apparatus of claim 15, further comprising:
fasteners for securing the security apparatus to the surface.

17. The apparatus of claim 16, wherein:
the actuator and the fasteners are positioned in the security apparatus so as to be accessible from an underside of the surface when the security apparatus is mounted on the surface.

18. The apparatus of claim 15, wherein:
the mechanical drivetrain comprises:
- a bracket to which bottom portions of the first and second arm assemblies are mounted;
- the screw affixed to the bracket; and
- a thumbscrew as the actuator, the thumbscrew threaded around the screw such that rotation of the thumbscrew in the first and second rotational directions translates the thumbscrew up and down relative to the screw, translation of the thumbscrew relative to the screw enabling the first and second arm assemblies to move between their open and closed positions.

19. The apparatus of claim 18, wherein the first and second rotational directions respectively comprise clockwise and counterclockwise.

20. The apparatus of claim 15, wherein:
the secured object comprises a wearable device; and
the security apparatus is configured to secure the wearable device to the support surface.

* * * * *